Patented Nov. 24, 1942

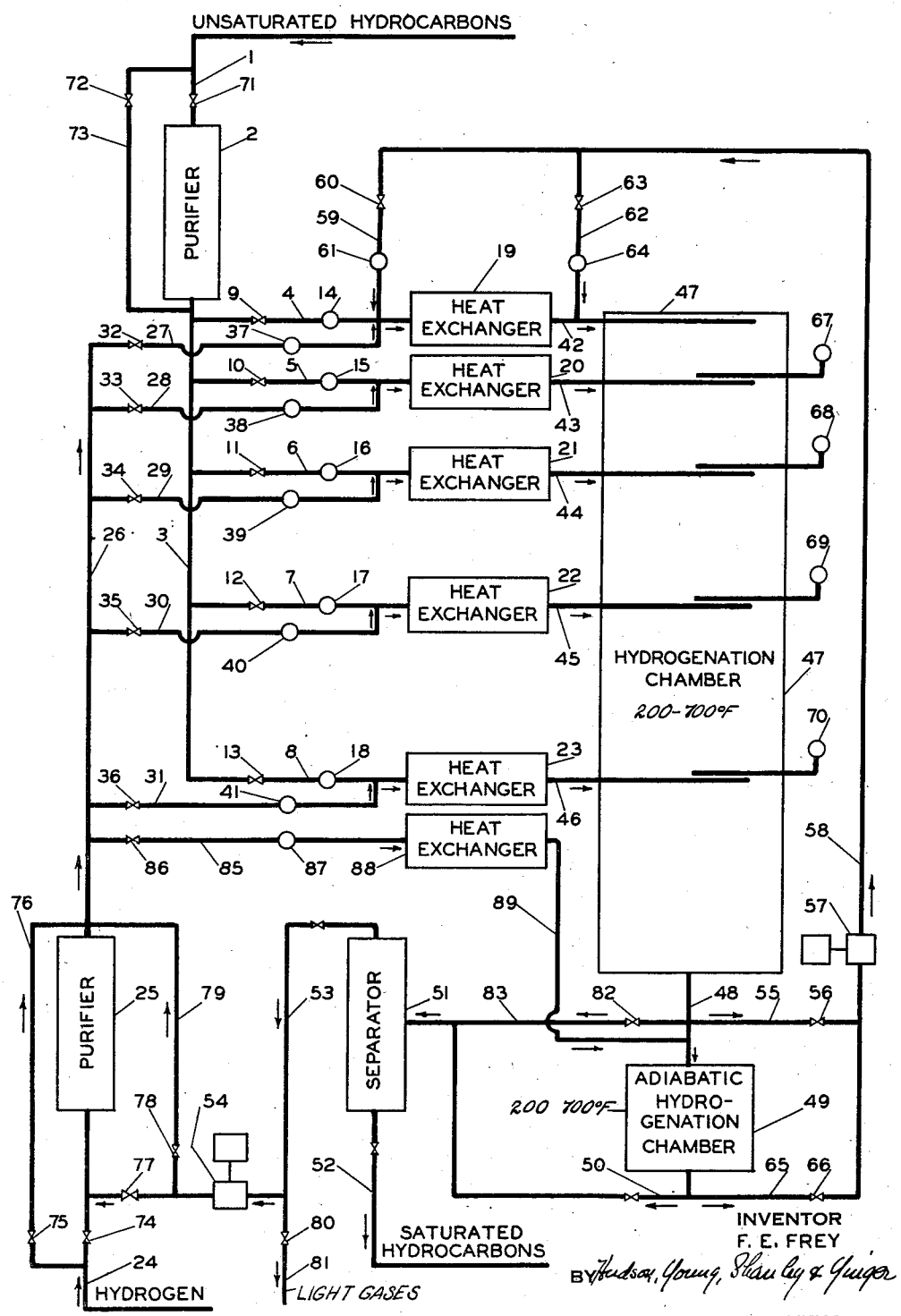

2,303,075

UNITED STATES PATENT OFFICE 2,303,075

CATALYTIC HYDROGENATION PROCESS

Frederick E. Frey, Bartlesville, Okla., assignor to Phillips Petroleum Company, a corporation of Delaware Application November 12, 1938, Serial No. 240,195

16 Claims. (Cl. 196—78)

This invention relates to catalytic hydrogenation, and particularly to the catalytic, non-destructive hydrogenation of unsaturated carbon to carbon bonds in molecules of organic compounds.

Because of the exothermic nature of the hydrogenation reaction, much heat is liberated when unsaturated compounds are hydrogenated to saturated compounds. When non-destructive hydrogenation is effected with the aid of a catalyst, control of the temperature of the catalyst is highly important. If the temperature is not controlled properly, portions of a body of catalyst become overheated or underheated; this results in undesired side reactions, such as destructive hydrogenation, in a decreased yield, and often in an increased rate of deactivation and/or deterioration of the catalyst. Overheating of the catalyst is especially detrimental, as it may sinter the active catalytic points and destroy part or all of the catalytic activity, or otherwise injure the catalyst.

Overheating of the catalyst, for example, may occur because of the development of a localized hot spot or zone in which an overly large fraction of the hydrogenation takes place. The production of such a hot zone is favored when the concentration of the reacting ingredients is high, as at moderate to high superatmospheric pressures, or in the presence of only small amounts of saturated hydrocarbons, for the reaction occurs at a rate that is considerably affected by the concentration of the reactants. In some cases in which the concentration is too high, the heat liberated by the hydrogenation may cause such a cumulative increase in the temperature that the catalyst at that point becomes overheated. As an overly large fraction of the hydrogenation takes place in the hot zone, other portions of the catalyst do not effect their proper share of the hydrogenation. In other words, the portion of the catalyst within the hot zone carries more than its share of the load and the portions outside of the hot zone carry less than their share. This condition is especially undesirable because the hot zone does not remain in one place but in consequence of the destruction of the catalyst, it moves in the direction of the flow of the reactants. The result is that the destruction of the catalyst is not limited to a small zone or amount but progresses throughout the entire body of catalyst. Serious losses of catalyst, reductions in yields, production of impurities, and other disadvantages result from such an uncontrolled mode of operation.

In the past, control of the temperature in exothermic catalytic conversion processes has been effected usually by means of a fluid medium in indirect heat-exchange relationship with the catalyst. To be successful, this mode of operation requires that the heat exchange be highly efficient. The reaction, therefore, is carried out generally in a plurality of relatively small and/or narrow catalyst chambers arranged in indirect heat-exchange relationship with the temperature-controlling medium. Such catalyst-chambers are made usually of tubes having a diameter of the order of 0.25 to 1.5 inches or of concentric tubes that form annular zones having thicknesses of the same order of magnitudes. Heat is removed by the temperature-controlling medium, which is in contact with the walls of the catalyst chambers. Equivalent systems in which temperature-controlling means are placed in contact with the catalyst, such as tubular members positioned within the catalyst body and containing a liquid of suitable boiling point or some other temperature-controlling medium, have also been proposed and used with some measure of satisfaction.

Such previously proposed catalytic conversion systems have a number of outstanding disadvantages, among which may be mentioned: the high cost of manufacture of the many catalyst-chambers required; the high cost of certain heat-exchange media such as mercury, diphenyl, and the like; the difficulty of making and maintaining fluid-tight connections or joints; the comparative inconvenience of catalyst replacement; and the difficulty of preventing leakage of the temperature-controlling medium, which may be toxic as well as expensive. In spite of these disadvantages, such systems have been used because many catalytic conversions must be effected within a narrow temperature range. If an efficient heat-exchange relationship is not maintained, the catalyst may become too hot; this may result in the production of impurities in the product by destructive hydrogenation and/or other undesired reactions and in the destruction of the activity of the catalyst. The necessity of an efficient heat-exchange relationship between the catalyst and the temperature-controlling medium precludes the use of comparatively large bodies of catalyst in an individual catalyst-chamber.

One of the objects of this invention is to provide a process for the catalytic, non-destructive hydrogenation of organic compounds.

Another object is to provide a process wherein hydrogen is added to unsaturated carbon to carbon bonds without completely separating one carbon atom from another.

It is an object of this invention to provide an improved process of effecting the catalytic non-destructive hydrogenation of unsaturated hydrocarbons boiling in the motor fuel range.

Another object of this invention is to provide an improved process for the catalytic non-destructive hydrogenation of the polymers of normally gaseous olefin hydrocarbons.

It is a further object of this invention to provide an improved process of effecting hydrogenation of gasoline-boiling-range olefin hydrocarbons without use of a multiplicity of relatively small tubular or narrow annular (or equivalent) catalyst-chambers in indirect heat-exchange relationship with a temperature-controlling medium.

Still another object of this invention is to provide an improved process for the catalytic non-destructive hydrogenation of organic compounds wherein the un-hydrogenated reactants absorb exothermic heat of reaction by direct heat exchange.

A further object of this invention is to provide a two-stage process for the non-destructive, catalytic hydrogenation of unsaturated hydrocarbons.

Other objects and advantages of the invention will be apparent to those skilled in the art from the following description, the accompanying drawing, and the appended claims.

I have now found that catalytic, non-destructive hydrogenation of unsaturated organic compounds or materials may be effected in an efficacious, economical, and advantageous manner when the operating conditions are so selected that only a small fraction or portion of the total hydrogenation can take place in any one portion or zone of a catalyst bed. I have also found that this may be accomplished by conducting the hydrogenation in a plurality of catalyst zones or chambers, having all the while an excess of hydrogen present over that required to hydrogenate the unsaturated material present, and preferably also having an appreciable proportion of saturated material present. By catalytic non-destructive hydrogenation I mean, broadly, the addition of hydrogen to an unsaturated bond between two adjacent carbon atoms without separation of the carbon atoms, such as occurs during the saturation of olefin hydrocarbons with hydrogen to form paraffin hydrocarbons having the same number of carbon atoms per molecule, and generally having also the same carbon skeleton, the formation of tristearin from triolein by the catalytic addition of hydrogen, and the like. More particularly my invention deals with the formation of saturated hydrocarbons in the motor fuel boiling range, such as the formation of paraffins from olefins, of cyclohexane from cyclohexene, or benzene or the like, and of other naphthenes from aromatics or hydroaromatics. Such catalytic non-destructive hydrogenations are not equivalents of each other, but the reactions which occur are quite similar, they are promoted by similar catalysts, and for a given process the most desirable conditions of operation in any particular case may be readily determined by trial.

In one modification of my invention a relatively small amount of unsaturated material in admixture with hydrogen is introduced into a hydrogenation chamber which contains a suitable body of solid hydrogenation catalyst, and the greatest dimension of which is in the direction of flow of fluids through it. Preferably there is associated with this unsaturated material a substantial amount of saturated material, which may well be a portion of the effluent of the hydrogenation chamber. I have found that at least one mol of such saturated material should be present for every mol of unsaturated material introduced to the process, and preferably the amount of saturated material should be higher than this although, except in the latter stages of the process, the saturated material need not be more than about 90 mol per cent of the total of the saturated and unsaturated material. A preferred ratio of saturated to unsaturated material will generally be found between about 2:1 and 5:1.

In this modification of my process, after this initial amount or portion of unsaturated material has been substantially saturated with hydrogen, an additional amount or portion of unsaturated material is added to the mixture. This portion immediately becomes diluted with saturated material, some of which has been formed in the first part of the hydrogenation chamber. As reaction progresses additional amounts or portions of material to be hydrogenated are added up to the capacity of the hydrogenating chamber and the catalyst therein to produce substantially completely saturated hydrocarbons. One of the important advantages of such a procedure is the close control of reaction temperature that is afforded. Thus, as the hydrogenation proceeds, the temperature of the mixture tends to rise, due to the exothermic nature of the reactions which occur. I have found that this temperature rise can be quite adequately controlled by introducing these subsequent portions of unsaturated material at temperatures appreciably below the reaction temperature, whereby the resultant mixture has a lower temperature, but one which will still be within a reaction range.

With a fresh, active catalyst, the initial temperature can be in the range of 200 to 300° F., the additional streams of hydrocarbon being added at temperatures between about 50 to 150° F. As the process continues and the catalyst loses activity, the inlet temperature may be raised, whereby the extent of hydrogenation remains substantially constant and the throughput of the process can be kept constant. The amount and extent of such a temperature change may be guided and controlled in connection with the composition of the effluent of the process and the amount of unsaturated material which has not been saturated. However, care should be taken to control the temperature so that the highest temperature in the catalyst chamber is not above a decomposition temperature, and generally the maximum temperature should be kept below about 650 to 700° F., and preferably below 600° F. As the temperature is raised in this manner, the temperatures of the streams which are added along the catalyst chamber may be a little higher than those hereinbefore indicated.

The points at which the portions of unsaturated material are added may be spaced equally along a uniform reaction chamber, or they may be spaced at distances which increase in the direction of flow through the chamber. As the mixture proceeds through the chamber and more material is added, the flow rate becomes higher and the reaction time becomes shorter, and more contact with the catalyst is needed to insure sufficient hydrogenation. The unsaturated material added throughout the chamber may or may not be accompanied by saturated material, and if necessary or desired additional hydrogen may be added at one or more of these points of addition. After the addition of the last portion of unsaturated material, a sufficient extent of the hydrogenation catalyst should be provided so that the effluent of the chamber will be essentially saturated, or at least so that saturation will have progressed to the desired extent. Instead of adding unsaturated material at various points in a hydrogenation catalyst, a substantially equivalent method, insofar as the results are concerned, is to use a series of smaller chambers, adding unsaturated material at the inlet to each chamber.

In another modification of my process, a mixture of unreacted unsaturated material and of partially reacted material containing both saturated and unsaturated material is passed through one hydrogenation chamber containing a body of hydrogenation catalyst and wherein the saturation is not allowed to go to completion, a portion of the effluent is recycled to the inlet of the chamber, and the rest of the effluent material is passed to a second hydrogenation chamber which contains a body of a suitable solid hydrogenation catalyst and which is maintained under substantially adiabatic conditions. This second chamber is rather thoroughly insulated, so that there is little if any loss or gain of heat through its walls during hydrogenation. In such a mode of operation the material introduced into it is approximately 90 per cent or more saturated, and it is only the last remaining small amount of unsaturated material which undergoes reaction. Under such conditions the temperature rise through the chamber, provided the effluent material from this second chamber is at least about 99 per cent or more saturated, will be an amount up to about 75 to 100° F., when all the material is in the vapor phase, but will only be about 10° F., if an appreciable amount of the hydrocarbon material is in the liquid phase and vaporizes as the temperature tends to rise, so that if the material charged to this chamber is about 90 per cent saturated its temperature should not be above about 550 to 600° F. at the most, and should generally be appreciably less. I have often found it advisable or advantageous to use a fresh, highly active batch of catalyst in this adiabatic chamber. Such a catalyst remains highly active for an extended period of time, and tends to promote complete saturation at a somewhat lower temperature. In case the effluent of the first hydrogenation chamber is at an elevated temperature in the region of 600° F. or higher, it may be desirable at times to cool it somewhat before introducing it into the adiabatic chamber.

I have further found that a very desirable mode of operation is obtained by combining these two modifications and operating them together as a further modification. Thus, in connection with the first hydrogenation chamber, multipoint addition of unsaturated material may be employed, but the extent of reaction after the last addition of unsaturated material has been made is limited, so that the total effluent from this chamber does not contain much more than about 90 mol per cent of saturated material. All or a part of the effluent is then passed directly to an adiabatic chamber wherein essentially complete saturation takes place. One desirable method of operation is to recycle a part of the effluent of the first chamber to be mixed with the initial portion of unsaturated feed stock, and to send only the remaining portion of the effluent to the adiabatic chamber. Partial or complete separation of recycled material from hydrogen may or may not take place as is found desirable. Hydrogen not separated is recycled as well as the other material, and it is generally desirable to operate in a manner such that a more or less representative portion of the effluent of the first chamber is recycled.

My invention will now be described with reference to the accompanying drawing, which shows a diagrammatic view of a preferred arrangement of apparatus. It will be obvious to those skilled in the art that modifications other than the specific arrangement shown may be used without passing beyond the scope of the invention.

An unsaturated feed stock is compressed to a suitable pressure by a pump not shown, and enters the system through pipe 1 into a purifier 2, wherein it may be freed from undesirable or troublesome impurities, such as those that may have a deleterious effect on the catalyst to be used for effecting hydrogenation. For example, if the feed stock contains sulfur compounds to an extent greater than that tolerated readily by the catalyst, purifier 2 may contain a material capable of decreasing the sulfur content to a value below the maximum tolerated by the catalyst. Such a material may be a body of the hydrogenation catalyst, after it had been used for effecting hydrogenation, for a catalyst that is too far spent to effect further hydrogenation economically may be still highly active for the adsorption of sulfur, or it may aid otherwise in removing impurities from such a charge stock.

From the purifier 2 the feed stock flows into distributor-pipe or manifold 3, from which it is distributed at will through a multiplicity of branches, such as pipes 4, 5, 6, 7, and 8, provided with control valves 9, 10, 11, 12, and 13 and with flowmeters 14, 15, 16, 17, and 18, into the heat exchangers 19, 20, 21, 22, and 23.

Simultaneously, hydrogen is compressed to a suitable pressure by a pump not shown and enters the system through pipe 24 passing into a purifier 25, wherein it may be freed from undesirable or troublesome impurities. From the purifier 25 it flows into the distributor-pipe or manifold 26, from which it may be distributed at will through a multiplicity of branches, such as pipes 27, 28, 29, 30, 31, and 85 provided with control valves 32, 33, 34, 35, 36, and 86 and with flowmeters 37, 38, 39, 40, 41, and 87 into the pipes 4, 5, 6, 7, and 8 and thence into the heat exchangers 19, 20, 21, 22, 23, and 88. Generally all or a large part of the hydrogen will be introduced to the inlet of the system through pipes 27 and 42.

From the heat exchangers 19, 20, 21, 22, and 23 the unsaturated feed stock and hydrogen, if present, pass concurrently through pipes 42, 43, 44, 45, and 46 into the hydrogenation chamber 47, which is an elongated chamber filled with a suitable hydrogenation catalyst, not shown. This chamber is preferably in a vertical position, but under conditions of temperature and pressure such that essentially only one phase is present, may be in a position other than vertical, if so desired. A suitable hydrogenation catalyst may be any material that promotes the addition of hydrogen to unsaturated carbon to carbon linkages, such as nickel, copper, iron, palladium, platinum, cobalt, chromium, manganese, titanium, molybdenum, vanadium and the like, in a finely divided state or in the form of oxides, and either alone or, as is preferable, in combination with one or more promoters, preferably supported on a porous material such as porcelain, kieselguhr, pumice, bauxite, etc.

If, in the catalytic hydrogenation chamber 47, the unsaturated hydrocarbons are hydrogenated to an extent short of total saturation, the effluent of this hydrogenation chamber 47, containing saturated hydrocarbons, any unreacted unsaturated hydrocarbons, and the excess hydrogen passes through pipe 48 and at least a portion of the stream passes into a second hydrogenation chamber 49, which is filled with a suitable hydrogenation catalyst such as one of those already mentioned and which may or may not be the same catalyst as is used in the chamber 47. This second hydrogenation chamber 49 is preferably rather thoroughly insulated, so that very little heat passes through the walls of the chamber tending either to cool the chamber or to heat it while in use. In this manner it is maintained under substantially adiabatic conditions, except as an entering or effluent stream may add or extract sensible heat. If desired, such insulation may contain heating and/or cooling coils, which will aid in heating the chamber and catalyst at the start of a run or to cool the same at the end of a run. However, if such means are present, I do not intend that they shall be used to any extent during the actual use of the chamber, so that the adiabatic characteristics of this chamber will be preserved. In this second hydrogenation chamber, or adiabatic hydrogenator, 49 any unsaturated hydrocarbons which have passed from chamber 47 without reaction therein are hydrogenated substantially completely into saturated hydrocarbons. In general, the unsaturate content of the hydrocarbons entering the adiabatic chamber 49 is less than 10 per cent and the prevailing conditions are such that the temperature rise caused by hydrogenation to substantially 100 per cent saturation does not exceed the temperature range in which the catalyst can effect hydrogenation without unduly great deactivation or deterioration of the catalyst or decomposition of hydrocarbons. The volume of catalyst in the adiabatic hydrogenation chamber 49 per unit quantity unsaturate treated may be two or more times that used in chamber 47, as its purpose is to effect complete hydrogenation. If desired, a partial cooling of the effluent from chamber 47 which is sent to adiabatic chamber 49 may be effected by means not shown.

The adiabatic hydrogenation chamber 49 may be by-passed, as through valve 82 and pipe 83, if complete hydrogenation is not desired, or if a sufficiently high degree of saturation is effected in hydrogenation chamber 47. If desired additional hydrogen may be added by opening valve 86 in pipe 85 and passing any desired amount of hydrogen from manifold 26 through meter 87, heat exchanger 88, and pipe 89 to pipe 48 immediately prior to the inlet of the adiabatic hydrogenation chamber 49.

The saturated hydrocarbons and excess hydrogen pass from the hydrogenation chamber 49 through valved pipe 50 into separator 51, wherein they are separated into the saturated product, which leaves the separator by valved pipe 52, and into hydrogen which passes through pipe 53 and pump 54 into pipe 24, to be used again in the process.

Part of the effluent material may be withdrawn from pipe 48 by means of pipe 55, which is provided with control valve 56, whether the adiabatic hydrogenation chamber 49 is used or not. This material is pumped by pump 57 through pipe 58 and through branch-pipe 59, which is provided with a control-valve 60 and a flowmeter 61, into pipe 4, or through branch-pipe 62, which is provided with a control valve 63 and a flowmeter 64, into pipe 42. Similarly, if adiabatic hydrogenation chamber 49 is used, part of the mixture of hydrogen and substantially completely hydrogenated material may be withdrawn from pipe 50 by means of pipe 65 which is provided with a control-valve 66, and pumped into pipe 4 or pipe 42. In either case, such a recycled stream is practically completely saturated as compared with the hydrocarbon stream charged to the process, and serves as an adequate diluent.

The function of the heat exchangers 19, 20, 21, 22, and 23 is to adjust the temperature of the material passing therethrough so that the material may pass thence into the hydrogenation chamber 47 and contribute to the maintenance of the desired temperature and extent of hydrogenation. The heat exchangers may pre-heat the mixture of unsaturated feed stock and hydrogen, or they may cool the mixture of unsaturated feed stock and hydrogen, in accordance with the requirements indicated by the temperature and/or the extent of hydrogenation prevailing in the corresponding zone in the chamber 47. If these heat exchangers are used to preheat the material passing through them, it will generally be only to a limited extent, so that the mixture from any one exchanger except the first will enter the hydrogenation chamber 47 at a temperature somewhat below the temperature of the mixture in the hydrogenation chamber immediately preceding the point of addition. If desired, further physical treatment may be given to the mixtures entering chamber 47, by apparatus not shown. For instance, such physical treatment may include a thorough mixing or physical emulsification of the organic material with hydrogen which may be added at any point. The temperature in the chamber 47 may be determined by any suitable means, such as the thermometers 67, 68, 69, and 70.

The pipes 42, 43, 44, 45, and 46 may enter the hydrogenation chamber 47 according to any desired arrangement. They may be spaced at increasing distances in the direction of flow of the material as indicated in the drawing, or they may be spaced equally throughout the length of the hydrogenation chamber 47. Under an arrangement such as that indicated the flow of unsaturated material in each of the several pipes 42, 43, 44, 45, and 46 may be made substantially the same and yet notwithstanding the increasingly greater dilution of the unsaturated material by already hydrogenated material in the direction of flow, substantially equal times of contact of the unsaturated material with the catalyst in every zone in the hydrogenator 47 may be obtained.

The proportions of hydrogen and unsaturated material passing through the heat exchangers 19, 20, 21, 22, and 23 may be controlled in any manner desired by means of the control valves 9 to 13 and 32 to 36. For example, in a possible mode of operation, hydrogen may be passed only through exchanger 19 and not through the other exchangers; however, hydrogen must be present in excess in the hydrogenation chambers 47 and 49. In such operation, valves 33 to 36 would be closed. The hydrogen and unsaturated feed stock passing through heat exchanger 19 would be heated sufficiently for the reaction to take place in chamber 47; and cold feed stock would be introduced as such through pipes 43, 44, 45, and 46, or it would first be heated in exchangers 20, 21, 22, and 23 only to such a degree that the heat developed by its subsequent hydrogenation would be consumed as sensible heat.

The conditions maintained in the chamber 47 depend somewhat on the catalyst and suitable conditions may be found readily by trial. In general, the temperature will be in the range 200 to 700° F. and the pressure will be in the range 20 to 2000 pounds per square inch. A preferred temperature range is 400 to 500° F. and a preferred pressure range is 500 to 1500 pounds per square inch.

If the unsaturated feed stock does not contain impurities in troublesome amount, the purifier 2 is not needed and may be by-passed by closing valve 71 in pipe 1 and opening valve 72 in pipe 73. Similarly, if the hydrogen entering the process through pipe 24 does not require purification, purifier 25 may be by-passed by closing valve 74 in pipe 24 and opening valve 75 in pipe 76; likewise, if the hydrogen in pipe 53 does not require purification, purifier 25 may be by-passed by closing valve 77 in pipe 53 and opening valve 78 in pipe 79.

If desired, part or all of the hydrogen in pipe 53 may be removed from the system through valve 80 and pipe 81.

The ratio of recycled hydrocarbon material in pipe 58 to fresh unsaturated feed stock in pipe 42 may be between about 1:1 to about 10:1, and is preferably between 2:1 and 5:1.

The hydrocarbons in the hydrogenation chamber 47 and in the adiabatic hydrogenation chamber 49 may be present in the liquid phase, in the vapor phase, or in both liquid and vapor phases. It is preferred to introduce the hydrocarbons in the liquid phase, as thereby the heat evolved by the hydrogenation may be used up as latent heat in the vaporization of part or all of the hydrocarbons; thus the temperature of the catalyst is prevented in some measure from becoming too high. For example, in a run made with diisobutylene diluted with twice its amount of the isooctane made by its hydrogenation, at a pressure of 750 pounds per square inch and a hydrogen concentration of 50 mol per cent, the temperature at the inlet to the hydrogenation chamber, which was filled with a nickel-copper-alumina catalyst supported on pumice, was 400° F.; at this temperature two-thirds of the hydrocarbon material was liquid. The temperature increases by 150° F. during the hydrogenation of the diisobutylene. On the other hand, when the temperature of the catalyst is 500° F., at which temperature virtually no hydrocarbons are in the liquid state, the temperature increase caused by the hydrogenation is 250° F.

The portions of the pipes 42 to 46 that are within the catalytic hydrogenation chamber 47 may be perforated to provide even distribution of the incoming material. Each of these portions may be modified by being constructed to form a perforated tube in the shape of a loop, spider, or circle, or the like. If desired, the zones of catalytic hydrogenation chamber 47 into which these portions extend may be kept devoid of catalyst, as for example by the use of perforated partitions, and may have a restricted cross-section.

Example I

As an example of the operation of my process, a hydrocarbon fraction in the motor fuel boiling range, and comprising essentially hydrocarbons produced by the catalytic polymerization of olefins produced by the thermal dehydrogenation of isobutane, was saturated with hydrogen in the presence of a nickel-copper-alumina catalyst. The catalyst was prepared by forming a concentrated aqueous solution containing nickel nitrate, copper nitrate, and aluminum nitrate, mixing with this solution crushed pumice of 6 to 8 mesh in size, boiling the resultant slurry, and finally drying and calcining the pumice so treated. This produced an intimate mixture of the oxides of nickel, copper, and aluminum on the pumice which, after treatment in the presence of hydrogen, resulted in an intimate mixture of nickel, copper, and alumina on the pumice. This catalyst is known as a nickel-copper-alumina catalyst.

The nickel-copper-alumina catalyst is placed in a vertical catalyst chamber. A stream of hydrocarbons consisting of the olefin polymers above mentioned is divided into three portions of about the same volumes. The first portion is mixed with about two volumes of saturated hydrocarbons produced in the process. This mixture is charged to the top of the catalyst chamber along with sufficient hydrogen to react with all the unsaturated hydrocarbons charged to the process with sufficient excess so that the effluent of the chamber comprises 50 mol per cent of free hydrogen. The reactants in the catalyst chamber are maintained under a total pressure of about 650 pounds per square inch, and the mixture is initially charged to the top at a temperature of about 320° F. As reaction proceeds hydrogen is consumed and heat is evolved, and about ¼ of the way down the bed from the top the temperature is about 445° F. At this point a second portion of the olefin polymer charge stock is added to the mixture at a temperature of 100° F. In this manner the olefin content of the reaction mixture is increased and the temperature lowered to about 410° F. but is still high enough for efficient hydrogenation. Just past the middle of the bed of catalyst the temperature of the reactants is about 525° F. and the third and final portion of the olefin polymer charge stock is added to the mixture at a temperature of about 100° F., so that the resultant mixture is at a temperature of about 485° F. Reaction continues in the catalyst chamber, and the effluent hydrocarbon material is appreciably less than 1 per cent unsaturated, at an effluent temperature of about 500° F. with essentially no hydrocarbons having a lower molecular weight than the hydrocarbons charged to the process. An appreciable amount of heat is lost to the atmosphere from the latter portions of this chamber which is uninsulated. The effluent of the chamber is cooled to about 90° F. and passed to a separator, where a separation is made between gases which comprise essentially free hydrogen, and a saturated hydrocarbon liquid. The gas is mixed with fresh hydrogen and returned to the inlet of the chamber. A portion of the hydrocarbon liquid, consisting of two-fifths of this liquid, is returned to the inlet of the chamber as recycle stock, and the remaining three-fifths is recovered as finished product. As the catalyst becomes deactivated, the temperature is gradually allowed to rise, thus keeping the extent of hydrogenation the same for a constant volume of charge stock.

Example II

The following is given as an example of the operation of another modification of my process. A nickel-copper-alumina catalyst is charged to each of two vertical catalyst chambers, the second of which contains about one-half the amount of catalyst which is in the first chamber. This second chamber is thoroughly insulated, so that with the interior at reaction temperature, such as 400 to 600° F., there is a minimum of heat loss through the walls of this chamber, that is to say, it operates under essentially adiabatic conditions. A stream of hydrocarbons consisting essentially of olefin polymers is mixed with a portion of the hydrocarbon effluent of the first chamber in such amounts that the molecular ratio of saturated to unsaturate hydrocarbons is about 2:1. This composite stream is passed to the inlet of the first catalyst chamber under a pressure of 775 pounds per square inch and at a temperature of about 355° F., along with hydrogen in an amount about four times that required to react with the unsaturated hydrocarbons present. The flow through this first chamber is such that saturation of the unsaturated hydrocarbons does not proceed to completion, and about 8 per cent of the hydrocarbon effluent of this chamber is still unsaturated. A portion amounting to slightly more than two-thirds of this effluent is separated and returned to the inlet of this first chamber to be mixed with fresh unsaturated hydrocarbons as described. The remaining portion of the effluent, which contains a large excess of free hydrogen, is cooled somewhat and passed to the second, or adiabatic chamber without any substantial reduction in pressure and at a temperature of about 400° F. In this second chamber, hydrogenation of unsaturated hydrocarbons proceeds essentially to completion, and the hydrocarbon effluent contains less than 0.2 per cent of unsaturated hydrocarbons. There is a temperature rise of about 10° F. through this adiabatic chamber, while the temperature rise through the first chamber is about 125° F., an appreciable loss of heat to the atmosphere taking place.

By the practice of this invention gasoline-range hydrocarbons prepared by catalytic and/or thermal polymerization of gaseous olefins may be hydrogenated catalytically and non-destructively to saturated hydrocarbons suitable for use in motor fuel either directly or after being blended with other motor fuel constituents such as straight run gasoline, saturated gasoline produced by alkylation, and the like. The hydrogenation is effected in an efficacious, economical and advantageous manner, the temperature of large bodies of catalyst being controlled below the sintering temperature of the catalyst by the controlled portionwise addition of suitably conditioned reactants.

I do not wish to exclude from my invention certain modifications or variations that will be obvious to those skilled in the art. For example, the effluents of the hydrogenation chambers may be placed in heat exchange relationship with the ingoing streams of reactants at various places throughout the process and to any desired degree. Hence, it is to be understood that, within the scope of the appended claims, the invention is as extensive in scope and equivalents as the prior art allows.

I claim:

1. An improved process for the catalytic, non-destructive hydrogenation of unsaturated organic material which comprises passing a charge stock comprising substantially unsaturated organic material to which has been added at least an equal volume of saturated organic material and a suitable amount of hydrogen to a first hydrogenation chamber containing a hydrogenation catalyst while at a superatmospheric pressure and at a non-destructive hydrogenation temperature, adding additional portions of said unsaturated organic material at a plurality of points to the mixture in said hydrogenation chamber and maintaining a reaction time such that only about 90 mol per cent of the organic material in the effluent of said chamber is saturated, passing at least a portion of the effluent of said first hydrogenation chamber through a second hydrogenation chamber containing a hydrogenation catalyst and maintained under substantially adiabatic conditions within a temperature range suitable for non-destructive hydrogenation, and separating from the effluent of said second chamber a fraction comprised essentially of saturated material produced.

2. An improved process for the catalytic, non-destructive hydrogenation of unsaturated organic material, which comprises passing a mixture, containing liquid organic material not more than 50 per cent of which is unsaturated and a suitable quantity of hydrogen, under a superatmospheric pressure through a body of hydrogenation catalyst maintained at a temperature suitable for the nondestructive hydrogenation of said unsaturated organic material and such that a substantial amount of said organic material exists in the vapor phase, adding additional portions of unsaturated organic material at a plurality of points to the mixture in contact with said body of hydrogenation catalyst, each said additional portion of unsaturated organic material being added at a temperature lower than the adjacent reaction temperature and substantially in liquid phase, and separating a fraction comprised essentially of saturated organic material from the effluent of said body of hydrogenation catalyst.

3. An improved process for the non-destructive hydrogenation of unsaturated hydrocarbons, which comprises passing a portion of a charge stock comprised substantially of liquid unsaturated hydrocarbons, in admixture with at least an equal volume of liquid saturated hydrocarbons and with a suitable amount of hydrogen, under a superatmospheric pressure and at a hydrogenation temperature such that a substantial amount of said organic material exists in the vapor phase and between about 200 and 600° F. through a hydrogenation chamber containing a suitable hydrogenation catalyst wherein non-destructive hydrogenation of unsaturated hydrocarbons takes place and heat is evolved, adding additional portions of said charge stock at a plurality of points to the hydrogenation chamber under a superatmospheric pressure and at a temperature below the temperature existing in said hydrogenation chamber and such that said added hydrocarbons are substantially in liquid phase, separating from the effluent of said hydrogenation chamber a representative portion thereof containing saturated hydrocarbons and returning said portion to be mixed with the first portion of said charge stock, and recovering a hydrocarbon mixture containing essentially hydrogenated hydrocarbons from the remaining portion of said effluent.

4. An improved process for the catalytic, non-destructive hydrogenation of unsaturated hydrocarbons in the motor fuel boiling range, which comprises passing a portion of a charge stock comprised essentially of unsaturated hydrocarbons in the motor fuel boiling range, in admixture with at least about an equal volume of saturated hydrocarbons of a similar boiling range and with hydrogen in excess of that sufficient to hydrogenate all of said charge stock, said mixture being under a superatmospheric pressure and at a temperature between about 200 and 600° F., into the top of an elongated, vertical hydrogenation chamber containing a body of solid hydrogenation catalyst, maintaining in said chamber hydrogenating conditions such that a substantial amount of said organic material exists in the vapor phase, adding additional portions of said charge stock under a superatmospheric pressure at a plurality of points to the mixture in said hydrogenation chamber, each of said additional portions being added substantially in liquid phase and in an amount such that the resultant mixture contains a ratio of saturated to unsaturated hydrocarbons between 1:1 and 10:1 and at a temperature which is substantially below the temperature existing in said chamber immediately prior to the point of addition and such that the final temperature of the mixture is at a non-destructive hydrogenating temperature below 700° F., and separating from the effluent of said chamber a fraction containing saturated hydrocarbons in the motor fuel boiling range.

5. An improved multistage process for the non-destructive hydrogenation of unsaturated hydrocarbons, which comprises passing a first portion of a charge stock comprised substantially of unsaturated hydrocarbons to a first hydrogenation chamber containing a hydrogenation catalyst, said first portion of charge stock being in admixture with a portion of the effluent of said first hydrogenation chamber and containing saturated hydrocarbons in an amount at least equal to the total amount of unsaturated hydrocarbons in the final mixture, and also in admixture a suitable amount of hydrogen, the said mixture being at a suitable superatmospheric pressure and at a non-destructive hydrogenation temperature, adding additional portions of said charge stock at a plurality of points to the mixture in said hydrogenation chamber and maintaining a reaction time in said chamber such that at least 90 mol per cent of the hydrocarbons in the effluent of said chamber are saturated, separating from the effluent of said hydrogenation chamber a portion thereof and passing said portion to be mixed with fresh charge stock, passing a remaining portion of the effluent of said first hydrogenation chamber, still under a superatmospheric pressure and at a non-destructive hydrogenation temperature to a second hydrogenation chamber containing a hydrogenation catalyst and maintained under substantially adiabatic conditions wherein unsaturated hydrocarbons are substantially completely hydrogenated, and removing from the effluent of said second chamber a fraction containing saturated hydrocarbons so produced.

6. The process of catalytic non-destructive hydrogenation of unsaturated hydrocarbons, comprising diluting unsaturated hydrocarbons with recycled hydrogenated material in a ratio between 1 to 1 and 1 to 10, adding hydrogen in excess, passing the mixture thus formed through a body of hydrogenation catalyst at a temperature of 200 to 700° F., adding additional portions of unsaturated hydrocarbons at a plurality of points in the body of catalyst, effecting non-destructive hydrogenation short of complete saturation of the unsaturated hydrocarbons in said body of catalyst, and completing the non-destructive hydrogenation with a second body of hydrogenation catalyst under substantially adiabatic conditions.

7. In a multistage, catalytic process for the non-destructive hydrogenation of unsaturated organic compounds, the steps which comprise passing unsaturated organic material to be hydrogenated, in admixture with at least an equal volume of organic material which has been hydrogenated to an extent of at least 90 per cent and hydrogen in excess of the amount necessary for hydrogenation of all the material to be hydrogenated, under a superatmospheric pressure over a hydrogenation catalyst maintained at a reaction temperature less than about 700° F. in a hydrogenation chamber, maintaining a reaction time such that at least 90 per cent of the desired non-destructive hydrogenation takes place, separating from the effluent of said chamber a substantial portion thereof and returning it to the inlet of said chamber, passing at least a portion of the remainder of said effluent, still under a superatmospheric pressure and at a reaction temperature less than 700° F. through a second hydrogenation chamber containing a hydrogenation catalyst under substantially adiabatic conditions and wherein non-destructive hydrogenation of unreacted material proceeds substantially to completion, and separating from the effluent of said second hydrogenation chamber organic hydrogenated material so produced.

8. An improved process for the non-destructive hydrogenation of unsaturated hydrocarbons, which comprises passing into a hydrogenation chamber, containing a hydrogenation catalyst at a non-destructive hydrogenation temperature, a hydrocarbon mixture containing a high concentration of unsaturated hydrocarbons, in admixture with a mixture comprising a portion of the effluent of said chamber containing therein hydrocarbons of which not more than 10 mol per cent are unsaturated hydrocarbons and in amount such that at least 50 mol per cent of the total hydrocarbons are saturated hydrocarbons and with hydrogen in an amount in excess of that required to react with all the unsaturated hydrocarbons present, maintaining a superatmospheric pressure on the mixture in said hydrogenation chamber and a reaction time such that complete saturation of unsaturated hydrocarbons does not take place and such that the unsaturated hydrocarbons in the effluent of said chamber are not more than 10 mol per cent of the hydrocarbons in said effluent, separating from the effluent of said chamber a portion thereof and passing said portion to the inlet of said chamber, passing a further portion of said effluent, still under a superatmospheric pressure and at a non-destructive hydrogenating temperature to a second hydrogenation chamber containing a hydrogenation catalyst and maintained under substantially adiabatic conditions, maintaining a reaction time such that the effluent of said chamber contains substantially no unsaturated hydrocarbons, and removing from the effluent of said second chamber saturated hydrocarbons so produced.

9. An improved process for the non-destructive hydrogenation of unsaturated hydrocarbons in the motor fuel boiling range, which comprises passing a charge stock comprised substantially completely of olefin hydrocarbons in the motor fuel boiling range to a first hydrogenation chamber containing a solid nickel-containing hydrogenation catalyst, said charge stock being in admixture with a portion of the effluent of said first hydrogenation chamber, in an amount such that the molar ratio of saturated hydrocarbons to olefin hydrocarbons in the final mixture is between 1:1 and 5:1, and also in admixture with hydrogen substantially in excess of that required to saturate all the olefin hydrocarbon, in said mixture, said mixture being under a superatmospheric pressure and at a reaction temperature between 200 and 700° F., maintaining a reaction time such that the olefin hydrocarbons in the effluent of said chamber are not more than 10 mol per cent of the hydrocarbons in said effluent, separating a portion of the effluent of said first hydrogenation chamber and returning said portion to be mixed with hydrocarbons charged to the process, passing the remainder of said effluent while still under a superatmospheric pressure and at a temperature between 200 and 600° F. into a second reaction chamber containing a solid nickel-containing hydrogenation catalyst and maintained under substantially adiabatic conditions wherein substantially complete hydrogenation takes place, and separating from the effluent of said second hydrogenation chamber a fraction containing substantially saturated hydrocarbons in motor fuel boiling range so produced.

10. The process of claim 9 wherein the catalyst is a nickel-copper-alumina catalyst.

11. An improved process for the catalytic nondestructive hydrogenation of olefin polymers, which comprises passing a portion of a charge stock comprised essentially of olefin polymers, in admixture with at least about an equal volume of saturated hydrocarbons and with an excess of hydrogen, to the top of a vertical catalyst chamber which contains a solid hydrogenation catalyst and wherein conditions of temperature and pressure are maintained suitable for the non-destructive hydrogenation of said olefin polymers, adding additional olefin polymers at a plurality of points to the mixture in the catalyst chamber as said mixture passes down through said chamber, maintaining an excess of hydrogen in said chamber, passing at least a portion of the effluent from the bottom of said vertical chamber through a second catalyst chamber which contains a suitable hydrogenation catalyst and which is maintained under substantially adiabatic conditions within a temperature range suitable for non-destructive hydrogenation, and recovering saturated organic material so produced from the effluent of said adiabatic chamber.

12. An improved process for the catalytic nondestructive hydrogenation of unsaturated organic material, which comprises passing a mixture, containing vaporizable organic material not more than 50 per cent of which is unsaturated, and a suitable quantity of hydrogen to effect complete saturation of said material, under a super-atmospheric pressure through a body of hydrogenation catalyst maintained in an elongated catalyst chamber at a temperature suitable for the non-destructive hydrogenation of said unsaturated organic material and such that a substantial amount of said organic material exists in the vapor phase, adding at a plurality of points spaced increasingly further apart in the direction of flow of the reactant material through said catalyst chamber additional portions of unsaturated organic material to the mixture in contact with said body of hydrogenation catalyst, each said additional portion of unsaturated organic material being added at a temperature lower than the adjacent reaction temperature and substantially in liquid phase, and separating a fraction comprised essentially of saturated organic material from at least a portion of the effluent of said body of hydrogenation catalyst.

13. An improved process for the catalytic, non-destructive hydrogenation of unsaturated organic material, which comprises passing a charge stock comprising substantially unsaturated organic material to which has been added at least an equal volume of saturated organic material and a suitable amount of hydrogen to a first hydrogenation chamber containing a hydrogenation catalyst while at a superatmospheric pressure and at a non-destructive hydrogenation temperature, adding at a plurality of points spaced increasingly farther apart in the direction of flow of reactant material additional portions of said unsaturated organic material to the mixture in said hydrogenation chamber and maintaining a reaction time such that only about 90 mol per cent of the organic material in the effluent of said chamber is saturated, separating from said effluent a portion thereof and passing said portion to be mixed with fresh charge stock, passing a remaining portion of the effluent of said first hydrogenation chamber, still under superatmospheric pressure and at a non-destructive hydrogenation temperature to a second hydrogenation chamber containing a hydrogenation catalyst and maintained under substantially adiabatic conditions wherein unsaturated organic material is substantially completely saturated, and removing from the effluent of said second chamber a fraction containing saturated material so produced.

14. An improved process for the catalytic non-destructive hydrogenation of liquid unsaturated organic material, which comprises passing a mixture comprising liquid saturated organic material and an initial portion of liquid unsaturated organic material in a ratio between about 1:1 and 5:1 and a suitable quantity of free hydrogen to the top of an elongated, vertical mass of solid hydrogenation catalyst maintained in a catalyst chamber at a temperature and under a superatmospheric pressure suitable for the non-destructive hydrogenation of said unsaturated organic material, said temperature and pressure being so correlated that a substantial amount of said organic material exists in the vapor phase, adding additional portions of said unsaturated organic material as a liquid at a plurality of points to the mixture in contact with said body of hydrogenation catalyst at a temperature below that existing in said catalyst mass at the point of addition and in an amount at each point such as to result in a mixture containing saturated and unsaturated organic material in a ratio between 2:1 and 10:1 and such that the resulting temperature of the mixture is at a desired non-destructive hydrogenation temperature, removing an effluent stream from the bottom of said catalyst chamber and separating therefrom a fraction containing saturated organic material so produced.

15. An improved process for the catalytic non-destructive hydrogenation of unsaturated organic material, which comprises passing a mixture containing organic material of which not more than 50 per cent is unsaturated together with an excess of hydrogen under a superatmospheric pressure downwardly through a first hydrogenation chamber containing a body of hydrogenation catalyst maintained at a temperature suitable for the non-destructive hydrogenation of said unsaturated organic material and such that said organic material exists in both vapor and liquid phases, maintaining a time of reaction such that hydrogenation of unsaturated material is incomplete and also such that at least 90 mol per cent of the organic material in the effluent of said chamber is saturated, passing at least a representative portion of the effluent of said first hydrogenation through a second hydrogenation chamber containing a body of hydrogenation catalyst which is maintained under substantially adiabatic conditions and within a temperature range suitable for non-destructive hydrogenation and such that said organic material is present both in the liquid and vapor phase, and completing the hydrogenation of unsaturated organic material in said second hydrogenation chamber.

16. In a catalytic process for the non-destructive hydrogenation of organic compounds, the steps which comprise passing a portion of the organic material to be hydrogenated, in admixture with at least an equal volume of hydrogenated material and with a suitable amount of hydrogen, under a superatmospheric pressure and at a non-destructive hydrogenation temperature such that a substantial amount of said organic material exists in the vapor phase through a hydrogenation chamber containing a body of solid hydrogenation catalyst, adding further portions of said organic material to be hydrogenated at a plurality of points in said hydrogenation chamber under a superatmospheric pressure and at a temperature such that said added organic material is substantially in liquid phase and is at a temperature such that the final temperature of the material in said hydrogenation chamber adjacent to a point of introduction is within a desired non-destructive hydrogenation temperature range, withdrawing an effluent stream from said hydrogenation chamber, returning a representative portion of said stream to the inlet of said chamber, and separating hydrogenated organic material from the remaining portion of said effluent.

FREDERICK E. FREY.